United States Patent [19]
Beach

[11] 3,820,142
[45] June 25, 1974

[54] CAMERA
[75] Inventor: David E. Beach, Penfield, N.Y.
[73] Assignee: Eastman Kodak Company, Rochester, N.Y.
[22] Filed: Mar. 12, 1973
[21] Appl. No.: 340,420

[52] U.S. Cl. .................................... 354/206
[51] Int. Cl. ............................... G03b 19/04
[58] Field of Search ......... 95/31 AC, 31 FL, 31 FM

[56] References Cited
UNITED STATES PATENTS

| | | |
|---|---|---|
| 3,603,236 | 9/1971 | Engelsmann .................. 95/31 X |
| 3,675,556 | 7/1972 | Rigolini ............................ 95/31 |
| 3,688,671 | 9/1972 | Irwin ............................... 95/31 |

Primary Examiner—Samuel S. Matthews
Assistant Examiner—Michael L. Gellner
Attorney, Agent, or Firm—Milton S. Sales

[57] ABSTRACT

A camera for perforated film includes film transport means which is disabled when a fresh film frame is in registry with the camera's exposure area. A shutter release member is operable to effect exposure of the film. A blocking member is urged to a first position by a spring permitting operation of the shutter release member. A second spring urges the blocking member to a second position preventing operation of the shutter release member when the transport means is not disabled. The blocking member is automatically moved to its first position whenever a cartridge is not located in the camera.

6 Claims, 4 Drawing Figures

CAMERA

CROSS REFERENCE TO RELATED APPLICATION

Reference is made to my commonly assigned, co-pending U.S. Pat. application Ser. No. 306,970 entitled "CAMERA" filed on Nov. 15, 1972, such application being a Continuation of Application Ser. No. 203,733, filed Dec. 1, 1971.

BACKGROUND OF THE INVENTION

1. Field of the Invention

The present invention relates to devices for the prevention of double exposures of film in a camera, and more particularly to a device for automatically disabling the double exposure prevention mechanism when the camera is not loaded with a film cartridge.

2. Description of the Prior Art

In cameras known in the prior art which are adapted to receive film having one metering perforation per film frame, a sensing pawl is commonly used to detect the arrival of a perforation at a predetermined position. The pawl rides on the film surface and falls into a perforation as it arrives at the pawl's location. Commonly such falling movement of the pawl effects movement of a ratchet tooth into locking engagement with the film transport mechanism to "meter" the camera. Generally, however, such devices have not been wholly satisfactory in cameras adapted to receive film having non-perforated backing paper because the sensing pawl can travel only the thickness of the film before contacting the backing paper. Metering failure may result if the camera mechanism is not sensitive enough to detect such a small amount of travel. With more sensitive mechanisms, there exists the problem of early metering when a false signal is received.

This problem was solved by cameras providing for a small amount of film movement after the sensing pawl has fallen into a perforation to pull the pawl therewith for effecting movement of a metering lever into locking engagement with the teeth of a gear in the film transport mechanism, thereby preventing further film movement. Cameras of this type are usually provided with a double exposure prevention mechanism which prohibits actuation of the shutter release lever until the pawl has been pulled by the film to latch the film transport mechanism. When the camera is not loaded, there is no film to pull the pawl and therefore the shutter release lever will remain locked, preventing operation of the camera's shutter mechanism for test operations.

Cameras which provide for shutter test operations are disclosed in U.S. Pat. No. 3,148,605 which issued Sept. 15, 1964 in the names of Dean M. Peterson et al. and U.S. Pat. No. 3,406,621 which issued Oct. 22, 1968 in the name of George Irwin. In these cameras, the shutter release lever is unblocked as soon as the sensing pawl falls into a perforation and before the pawl has been pulled by the film to lock up the film transport mechanism. While the shutter release lever will be operable for test purposes when the camera is unloaded, the possibility that the shutter may be released before the film has been fully advanced presents the hazard that an operator will release the shutter mechanism without fully winding the film to the next frame.

In my commonly assigned, copending U.S. Pat. application Ser. No. 306,970 entitled "CAMERA" filed on Nov. 15, 1972, as a Continuation of application Ser. No. 203,733, filed Dec. 1, 1971, I disclose a camera having sensing means for detecting whether or not a film cartridge has been received. If a cartridge is present, a double-exposure prevention (DEP) mechanism is activated after the shutter has been released. When there is no cartridge, the film sensing pawl is moved to a position disabling the DEP so that the shutter mechanism may be repeatedly operated. In addition to disabling the DEP, the cartridge sensing means disables the camera's metering mechanism so that the film transport device can be operated to cock the shutter. While the camera disclosed in that application works satisfactorily for its intended purpose, the necessity of disabling the metering mechanism whenever there is no cartridge in the camera prevents the testing of the metering mechanism.

SUMMARY OF THE INVENTION

The present invention is an improvement over the camera disclosed in my hereinbefore mentioned U.S. Application Ser. No. 306,970. By the present invention, the camera's double exposure prevention means is disabled to permit shutter operation for testing the camera's shutter mechanism when the camera is not loaded by a simpler and more economical means than that described in the earlier application. Further, since the camera's metering mechanism is not disabled, the operator may manually test that mechanism as well as the shutter operation.

In accordance with the above, a preferred embodiment of the present invention includes a camera having film transport means for advancing the film of a received cartridge. Metering means are placed in an active condition disabling the transport means following film advance, and following an exposure, the shutter release member is prevented from reoperation by a blocking member until the film has been transported a predetermined distance. The blocking member is spring urged toward a position enabling operation of the shutter release member, and a second spring moves the blocking member to a position preventing operation of the shutter release member when the metering means is in its inactive condition. To permit testing of the shutter release member, means are provided for detecting the presence and absence of a film cartridge in the camera and for moving the blocking member to its position permitting operation of the shutter release member when a cartridge is not in the camera.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

FILM ADVANCE AND SHUTTER MECHANISMS

Figure 1:
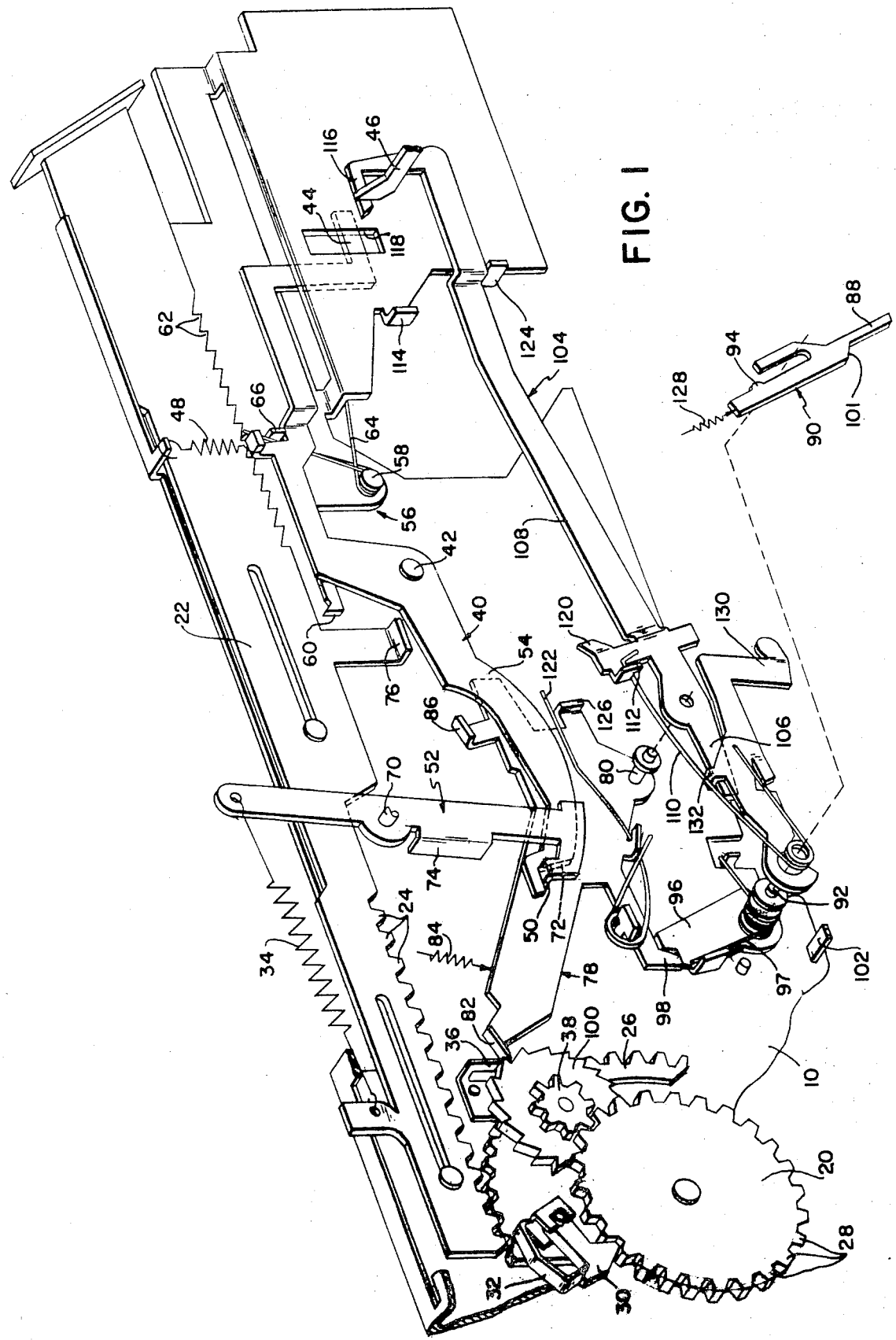
FIG. 1 is an exploded perspective view of a portion of a camera in accordance with the present invention wherein the camera elements are arranged ready to make an exposure.

Referring now to FIG. 1, the camera illustrated as the preferred embodiment includes a housing 10 into which a strip 12 of film with perforations 14 along one edge has been loaded. The film is contained in a cartridge 16 partially shown in FIGS. 2 and 3. The cartridge may be of the type shown in coassigned U.S. Pat. No. 3,138,081 which issued on June 23, 1964 to Hubert Nerwin, and may contain opaque backing paper 18.

A slide member 22 is reciprocally mounted on housing 10 by a pin-in-slot arrangement. The slide member has a rack with a plurality of teeth 24 in meshing engagement with the teeth of a gear sector 26 which is coaxial with a gear 20 and rotatable relative thereto. Rotation of gear 20 in a counterclockwise direction winds film in the direction of an arrow 25 shown in FIG. 3. The gear has teeth 28 in meshing engagement with a ratchet pawl 30 rotatably mounted on gear sector 26. Pawl 30 is biased by a spring 32 into engagement with the teeth of gear 20 so that upon movement of slide member 22 to the left as viewed in FIG. 1, the rotary movement of gear section 26 is transmitted to gear 20, thereby advancing film along the camera's exposure plane. As slide member 22 is returned to the right by a coil spring 34, gear 20 is prevented from rotating in a clockwise direction by a leaf spring 36 which cooperates with the teeth on a ratchet wheel 100 on a gear 38 in meshing engagement with gear 20.

A lever 40 is pivotally mounted on a stud 42 and includes a tab 44 which may be depressed by a shutter release member 46 in a manner to be explained to rotate lever 40 in a clockwise direction against the force of a spring 48. Movement of lever 40 in a counterclockwise direction by spring 48 is limited by an abutment 50 on a high energy lever 52. Lever 40 has an arcuate portion 54 which is lifted by the clockwise rotation of the lever.

An anti-short lever 56 is mounted on housing 10 for rotation about a stud 58. Lever 56 carries a ratchet pawl 60 which may engage ratchet teeth 62 on slide member 22. A spring 64 tends to rotate lever 56 in a clockwise direction to engage ratchet pawl 60 and ratchet teeth 62, but the lever is normally held in the disengaged position shown by a tab 66 thereon which engages lever 40.

High energy lever 52 is mounted on housing 10 and is biased by spring 34 for rotation in a counterclockwise direction about a stud 70. Lever 52 is held against such rotation by tab 50 which latches over a surface 72 on arcuate portion 54 of lever 40 until that lever is rotated in a clockwise direction. A bent tab portion 74 on high energy lever 52 is aligned with a push member 76 on slide member 22 to cock the high energy lever when the slide member is moved to the left, as will be explained hereinafter.

FILM METERING MECHANISM

A metering lever 78 is rotatably carried on housing 10 by a stud 80 and carries a metering pawl 82 urged toward an active position in engagement with the teeth of ratchet 100 by a spring 84 to prevent rotation of gear 38. A tab 86 is carried by metering lever 78 in alignment with high energy lever 52.

A film sensing pawl 88 on a lever 90 is mounted for rotational and longitudinal movement on a stud 92 on camera housing 10. Lever 90 has a tab 94, and a retainer 96 is also rotatably carried by stud 92 and is urged in a counterclockwise direction by a spring 97 into abutment with a tab 98 on metering lever 78. Sensing pawl 88 has a cam surface 101 which cooperates with a projection 102 in a manner to be described.

DOUBLE EXPOSURE PREVENTION MECHANISM

A blocking member 104 is rotatably carried on stud 80 and has a first arm 106 extending to the left of stud 80 and a second arm 108 extending in the opposite direction. A spring 110 engages an abutment 112 on arm 108 to urge the blocking member in a counterclockwise direction, such movement being limited by a tab 114 on housing 10. A tab 116 on arm 108 alternately covers and uncovers an opening 118 in housing 10 depending on the position of blocking member 104. A tab 120 on arm 108 is adapted to cooperate with a spring 122 in a manner to be hereinafter explained to move the blocking member in a clockwise direction until arm 108 engages a tab 124. When not engaging tab 120, spring 122 rests on a tab 126 on metering lever 78.

OPERATION

Figure 2:
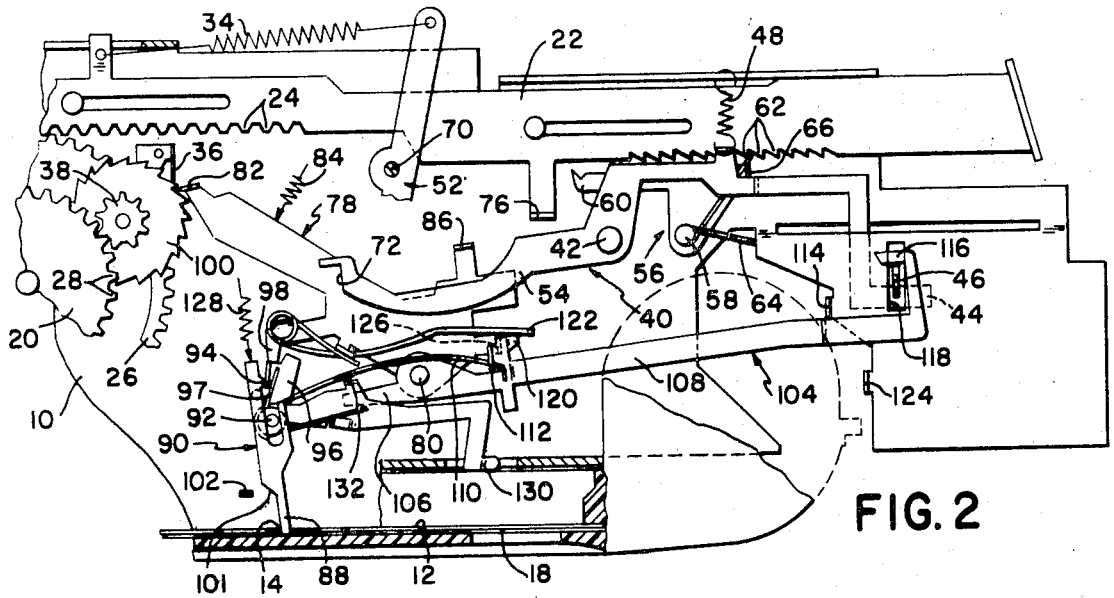
FIGS. 2 and 3 are elevational views of the camera of FIG. 1 showing three sequential relative positions of the camera elements during operation of the camera.

FIG. 2 shows the elements of the camera in their respective positions after an unexposed frame of film has been wound into the exposure area. The camera is now ready to be operated to take a picture. Metering pawl 82 of lever 78 is in its active position in engagement with ratchet 100 so that slide member 22 cannot be moved to the left to transport more film. Film sensing pawl 88 is extended into perforation 14 in the film, and high energy lever 52 has been put into a cocked position by push member 76 of the slide member and is held thereagainst the force of spring 34 by tab 50 engaging surface 72 on arcuate portion 54 of lever 40. Anti-short stroke lever 56 is held against spring 64 by tab 66 engaging lever 40 to keep pawl 60 out of ratchet teeth 62.

Note in FIG. 2 that tab 126 of metering lever 78 has lifted spring 122 from engagement with tab 120 of blocking member 104. Therefore, spring 110 is free to rotate the blocking member until arm 108 engages tab 114. In that position of the blocking member, its tab 116 has moved out of alignment with shutter release member 46 so that the shutter release member may pass through opening 118.

Now, to expose a picture, shutter release member 46 is depressed through opening 118 until its ramped surface engages tab 44 to rotate lever 40 in a counterclockwise direction against spring 48. This raises arcuate portion 54 so that tab 50 slips over surface 72 to permit high energy lever 52 to rotate about pivot 70 toward its released position. During its rotation, the high energy lever contacts a portion of the camera's shutter, not shown, to actuate the shutter. As the high energy lever comes into contact with tab 86 of metering lever 78, it transfers kinetic energy to the metering lever to move the lever to its full line position shown in FIG. 3. Upon clockwise rotation of lever 40, pawl 60 of anti-short stroke lever 56 is raised to engage ratchet teeth 62. When shutter release member 46 is withdrawn from contact with tab 44, lever 40 can only rotate in a counterclockwise direction until the lower surface of arcuate portion 54 abuts tab 50 on the high energy lever. This keeps lever 40 out of blocking engagement with tab 66 so that anti-short stroke lever 56 remains in its operative position shown in FIG. 3.

Figure 3:
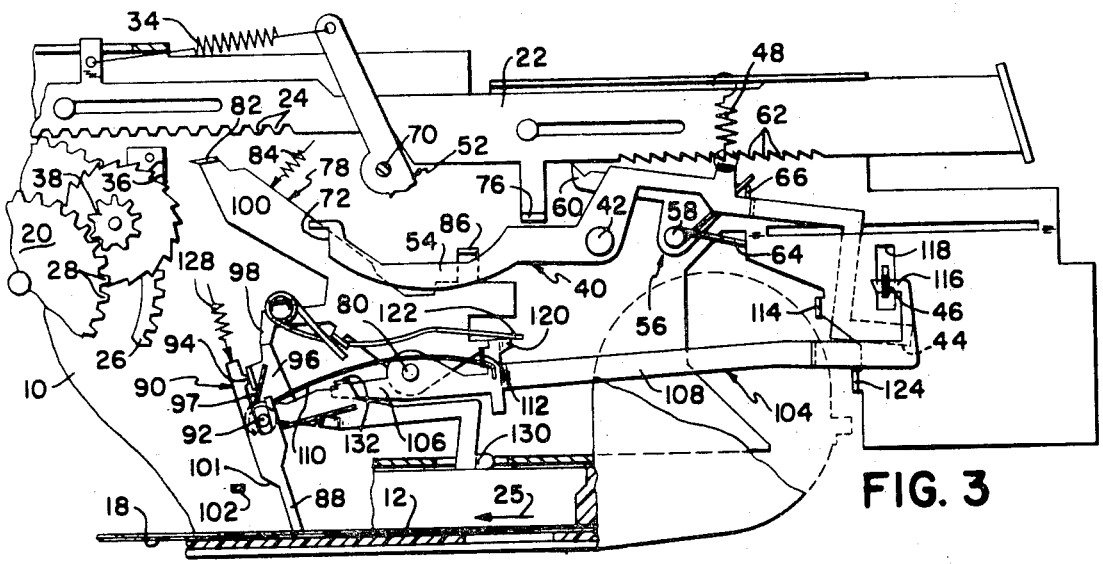

When metering pawl 82 is raised to the position shown in FIG. 3, tab 126 of a metering lever 78 is lowered to a position below tab 120 of blocking member 104. Now, spring 122 engages tab 120 and, since spring 122 exerts more force than spring 110, arm 104 is lowered into contact with tab 124 and tab 116 lies in the path of shutter release member 46.

Because metering pawl 82 has been disengaged from ratchet 100, advance slide 22 can now be moved to the left. Such movement rotates gear sector 26 in a counterclockwise direction, causing similar rotation of gear 20 and clockwise rotation of gear 38 and ratchet 100. Rotation of gear 20 causes film to be advanced to the left as viewed in FIG. 3 to begin rotating film sensing finger 88 in a clockwise direction. This brings cam surface 101 on the sensing finger into engagement with abutment 102 on the camera housing so that sensing pawl 88 is withdrawn upwardly from perforation 14. After the sensing pawl clears the perforation, spring 97 rotates retainer 96 and sensing lever 90 in a counterclockwise direction to its full line position shown in FIG. 3. Tab 98 of metering lever 78 is now positioned above an abutment surface on the retainer to prevent the metering lever from returning to its original position. Sensing pawl 88 now rests on the film surface and is urged against that surface by a spring 128.

As slide member 22 is moved to the left, pushing member 76 rotates high energy lever 52 in a clockwise direction until its tab 50 falls over surface 72 on lever 40. This latches the high energy lever in its cocked position shown in FIGS. 1 and 2, and allows further counterclockwise direction of lever 40 to withdraw ratchet pawl 60 from teeth 62 so that the slide may be returned to the right. In the illustrated embodiment, more than one actuation of slide member 22 is required to advance film by one frame. Therefore, after one such actuation, sensing pawl 88 is positioned somewhere between film perforations. Since metering lever 78 is retained in its inactive position by retainer 96, slide member 22 is free to be moved again to the left and shutter release member 46 cannot pass tab 116 of blocking member 104.

When the next succeeding film perforation 14 reaches the position of sensing pawl 88, the pawl drops into the perforation. As the operator continues to move slide member 22 to the left, the trailing edge of perforation 14 causes clockwise rotation of sensing lever 90 and retainer 96 to clear tab 98 of metering lever 78, thereby allowing the metering lever to be moved by spring 84 to its position shown in FIG. 2 preventing further movement of slide member 22 to the left. Since anti-short stroke member 56 has been held in its FIG. 2 position throughout the entire second operation of slide member 22, it cannot prevent return movement of the slide member after the film advance mechanism has been locked up.

DEMONSTRATION FEATURE

Figure 4:
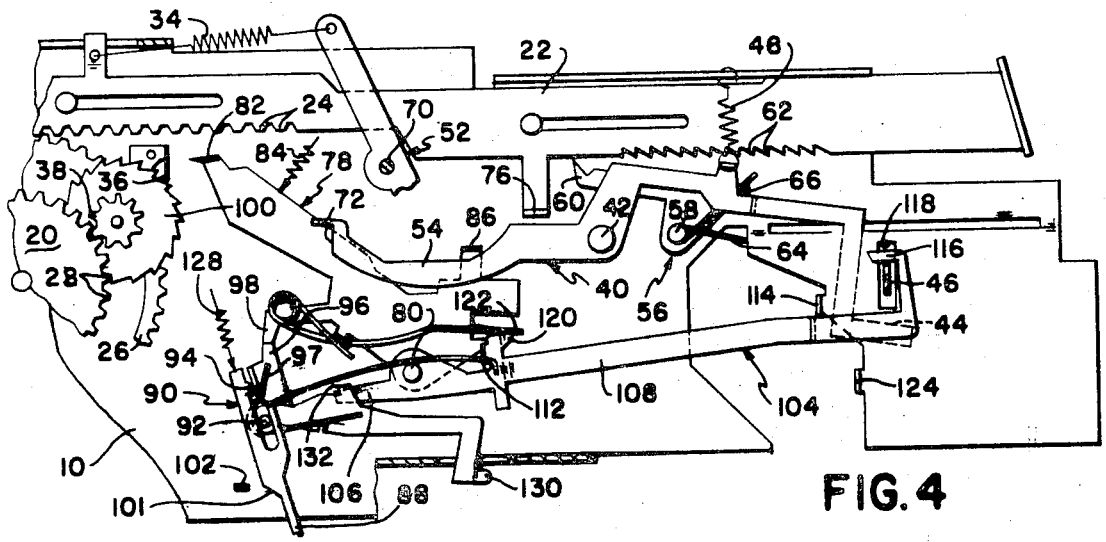
FIG. 4 is an elevational view similar to FIG. 3 showing the arrangement of the camera elements when the camera is not loaded with a film cartridge.

Since as explained above, shutter release member 46 cannot be operated once a picture has been taken until the advancing film rotates retainer 96 to remove tab 116 from below member 46, the shutter could not normally be operated for test purposes if the camera was not loaded. Therefore, I have provided a mechanism for removing tab 116 from the path of member 46 whenever there is no cartridge in the camera housing. Referring to FIG. 4, a cartridge sensing lever 130, which is rotatable about stud 92 and which is biased in a clockwise direction by spring 110, rotates to an extended position shown in FIG. 4 whenever there is no cartridge in the camera. At that time, a tab 132 on the cartridge sensing lever rotates blocking member 104 in a counterclockwise direction until arm 108 contacts tab 114 thereby removing tab 116 from the path of shutter release member 46.

To test the metering mechanism when there is no cartridge in the camera, the operator need only move slide member 22 to the left to cock high energy lever 52 and to then manually move sensing pawl 88 to the left. If operating properly, the metering mechanism will permit pawl 82 to fall into the teeth of ratchet wheel 100. This can be detected because the operator will no longer be able to move slide member 22.

The invention has been described in detail with particular reference to preferred embodiments thereof, but it will be understood that variations and modifications can be effected within the spirit and scope of the invention.

I claim:

1. A camera of the type having (1) a housing defining a space for receiving a cartridge containing roll film, (2) transport means for advancing the film of a received cartridge along an exposure plane in said camera, (3) metering means having an active condition for disabling said transport means and an inactive condition, (4) a shutter mechanism operable to effect exposure of a frame of film at said exposure plane, and (5) a shutter release member movable through a path for operating said shutter mechanism; said camera further comprising:

a blocking member movable between (1) a first position in said path for preventing movement of said shutter release member through said path to operate shutter mechanism and (2) a second position remote from said path whereby said shutter release member may be moved through said path;

first spring means for urging said blocking member toward its second position;

second spring means for moving said blocking member to its first position, said second spring means having (1) a first state in which the force of said second spring means on said blocking member is insufficient to move said blocking member to its first position against the force of said first spring means and (2) a second state in which the force of said second spring means on said blocking member is sufficient to move said blocking member to its first position against the force of said first spring means; and means associated with said second spring means and said metering means for (1) placing said second spring means in its first state when said metering means is in its active condition and (2) placing said second spring means in its second state when said metering means is in its inactive condition.

2. A camera of the type having (1) a housing defining a space for receiving a cartridge containing roll film, (2) transport means for advancing the film of a received cartridge along an exposure plane in said camera, (3) metering means having an active condition for disabling said transport means and an inactive condition, (4) a shutter mechanism operable to effect exposure of a frame of film at said exposure plane, and (5) a shutter release member movable through a path for operating said shutter mechanism; said camera further comprising:

a blocking member movable between (1) a first position in said path for preventing movement of said shutter release member through said path to operate said shutter mechanism and (2) a second position remote from said path whereby said shutter release member may be moved through said path;

first spring means for urging said blocking member toward its second position;

second spring means for moving said blocking member to its first position, said second spring means having (1) a first state in which the force of said second spring means on said blocking member is insufficient to move said blocking member to its first position against the force of said first spring means and (2) a second state in which the force of said second spring means on said blocking member is sufficient to move said blocking member to its first position against the force of said first spring means;

means associated with said second spring means and said metering means for (1) placing said second spring means in its first state when said metering means is in its active condition and (2) placing said second spring means in its second state when said metering means is in its inactive condition; and means for moving said blocking member to its second position whenever no cartridge is received in said space.

3. A camera of the type having (1) a housing defining a space for receiving a cartridge containing roll film, (2) transport means for advancing the film of a received cartridge along an exposure plane in said camera, (3) metering means having an active condition for disabling said transport means and an inactive condition, (4) a shutter mechanism operable to effect exposure of a frame of film at said exposure plane, and (5) a shutter release member movable through a path for operating said shutter mechanism; said camera further comprising:

a blocking member movable between (1) a first position in said path for preventing movement of said shutter release member through said path to operate said shutter mechanism and (2) a second position remote from said path whereby said shutter release member may be moved through said path;

first spring means for urging said blocking member toward its second position;

second spring means for moving said blocking member to its first position, said second spring means having (1) a first state in which the force of said second spring means on said blocking member is insufficient to move said blocking member to its first position against the force of said first spring means and (2) a second state in which the force of said second spring means on said blocking member is sufficient to move said blocking member to its first position against the force of said first spring means;

means associated with said second spring means and said metering means for (1) placing said second spring means in its first state when said metering means is in its active condition and (2) placing said second spring means in its second state when said metering means is in its inactive condition;

sensing means for detecting the presence and absence of a film cartridge in said space; and means responsive to said sensing means for moving said blocking member to its second position when no cartridge is received in said space.

4. A camera of the type having (1) a housing defining a space for receiving a cartridge containing roll film perforated at predetermined metering intervals, (2) transport means for advancing the film of a received cartridge along an exposure plane in said camera, (3) metering means having an active condition for disabling said transport means and an inactive condition, (4) a film sensing pawl for detecting the arrival of a film perforation at a predetermined location along the exposure plane, (5) means associated with said metering means and said film sensing pawl for placing said metering means in its active condition upon detection of a film perforation at said predetermined position by said film sensing pawl, (6) a shutter mechanism operable to effect exposure of a frame of film at said exposure plane, and (7) a shutter release member movable through a path for operating said shutter mechanism; said camera further comprising:

a blocking member movable between (1) a first position in said path for preventing movement of said shutter release member through said path to operate said shutter mechanism and (2) a second position remote from said path thereby said shutter release member may be moved through said path;

first spring means for urging said blocking member toward its second position;

second spring means for moving said blocking member to its first position, said second spring means having (1) a first state in which the force of said second spring means on said blocking member is insufficient to move said blocking member to its first position against the force of said first spring means and (2) a second state in which the force of said second spring means on said blocking member is sufficient to move said blocking member to its first position against the force of said first spring means; and means associated with said second spring means and said metering means for (1) placing said second spring means in its first state when said metering means is in its active condition and (2) placing said second spring means in its second state when said metering means is in its inactive condition.

5. A camera as defined in claim 4 further comprising means for moving said blocking member to its second position when no cartridge is received in said space.

6. A camera as defined in claim 4 further comprising:

sensing means for detecting the presence and absence of a film cartridge in said space; and means responsive to said sensing means for moving said blocking member to its second position when no cartridge is received in said space.

* * * * *